Figure 1:
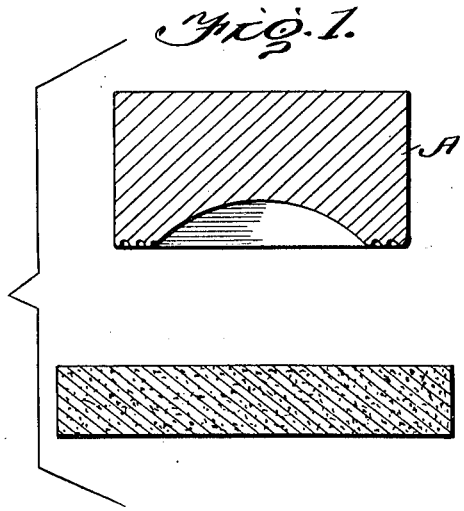

H. C. MILLER.
METHOD OF MAKING DIAPHRAGMS.
APPLICATION FILED JUNE 2, 1913.

1,206,881.

Patented Dec. 5, 1916.
2 SHEETS—SHEET 1.

Witnesses

Inventor
H. C. Miller
By
Attorney

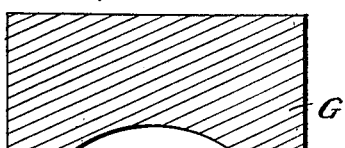
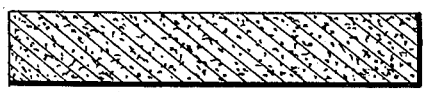
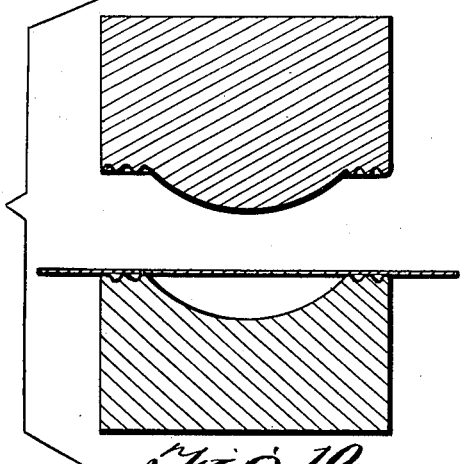
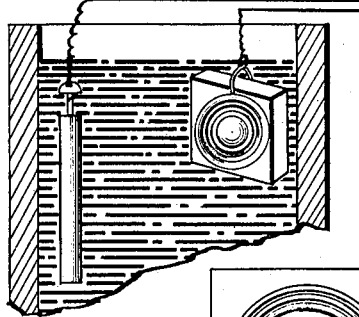
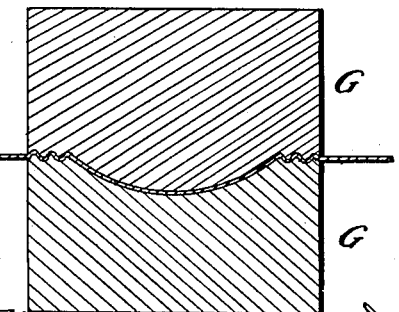
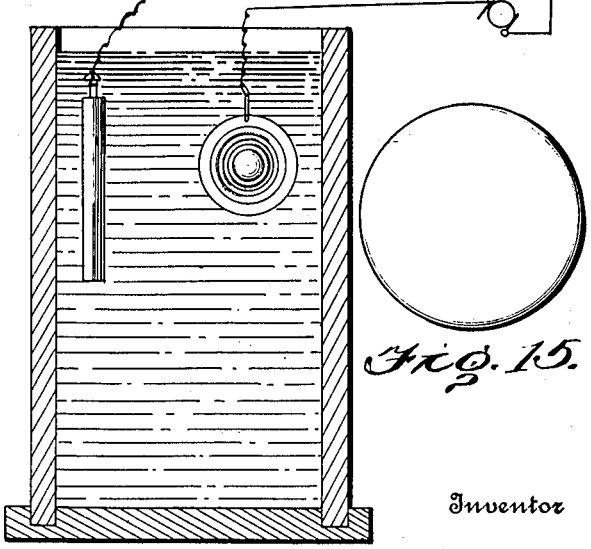
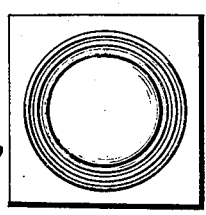

UNITED STATES PATENT OFFICE.

HENRY C. MILLER, OF WATERFORD, NEW YORK.

METHOD OF MAKING DIAPHRAGMS.

1,206,881.  Specification of Letters Patent.  Patented Dec. 5, 1916.

Application filed June 2, 1913. Serial No. 771,357.

*To all whom it may concern:*

Be it known that I, HENRY C. MILLER, a citizen of the United States, residing at Waterford, in the county of Saratoga and State of New York, have invented certain new and useful Improvements in Methods of Making Diaphragms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to diaphragms, and the art of making the same.

The making of diaphragms that will receive and reproduce all tones without distortion is exceedingly difficult, but I have discovered a method of producing diaphragms of the most delicate structure, lightness, and desired stiffness. My method also enables me to produce diaphragms of various designs. More or less of the surface can be made elastic or rigid, as desired, the resiliency being of the highest quality which is so necessary to reproduce all the tones. These features are essential and must be incorporated in diaphragms to produce high quality of sound and tone.

The invention also aims to produce a method whereby any number of diaphragms can be made exactly alike to receive and reproduce the same sound qualities, which is not possible by any known process.

In producing a diaphragm from mica, it is impossible to produce two diaphragms exactly alike, because of the layer structure of the material, for one layer too much or too little makes a noticeable difference; consequently the sheets are unbalanced and the thickness of the diaphragms is unequal, and if one is exactly right it is accidental. This can be readily appreciated when producing sound from two instruments side by side of the same value, style, and make, and operating at the same speed. It is therefore positively impossible to make two diaphragms exactly alike by the old method. This is also true when using diaphragms constructed from metal, whether the surfaces be plain or embossed. Other compositions, such as paper, linen, hard rubber, celluloid, are not to be considered in this class, as is also wood, which cannot be made to withstand the actions of the atmosphere. One of the fundamental reasons why metal diaphragms cannot be made exactly alike is that a strip of metal cannot be rolled perfectly even. This is mechanically an impossibility. Also there are soft and hard spots in strips, as well as buckles in the surfaces that are not perceptible to the eye, and it results that a flat diaphragm made from metal is not a success. The next thing to consider is a corrugated diaphragm struck up either in dish form, or one having ribs of different shape and design, to stiffen or flex the surfaces. In the first place, the uneven thickness and buckles aforesaid in the strips from which the diaphragms are made, must be considered. Let it be said that the male and female embossing dies for making the diaphragms are set approximately correct in the press. It follows if the metal is too soft or too hard, it makes a noticeable difference in the result. If the metal is thicker than the space between the dies, it is apparent the molecules will be put under undue pressure, and if too thin, it will not receive sufficient pressure to form the diaphragm correctly.

In the manufacture of diaphragms, one hundred thousandth of an inch is a big allowance in the thicknesses of the metal, and in the rolling of strips the variation is far greater; also the molecules of the sheets whether put through the rolling process or embossing dies, are unevenly pressed which produces conditions that cannot be made standard; hence such methods are not practical.

To illustrate my invention, I have conventionally illustrated the various steps in the accompanying drawings, in which—

Figure 2:
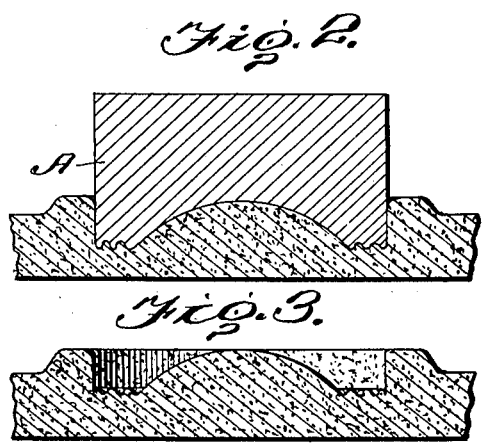
Figures 3, 4, 5:
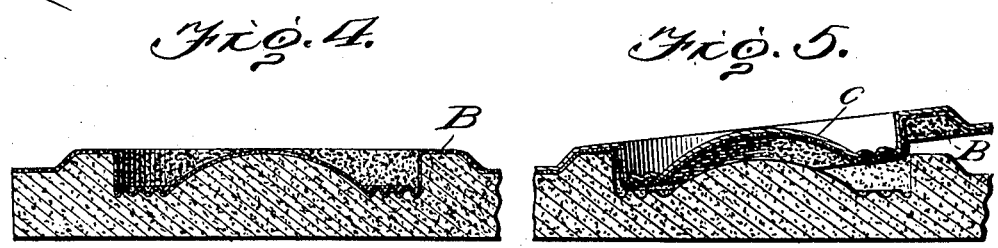
Figure 6:
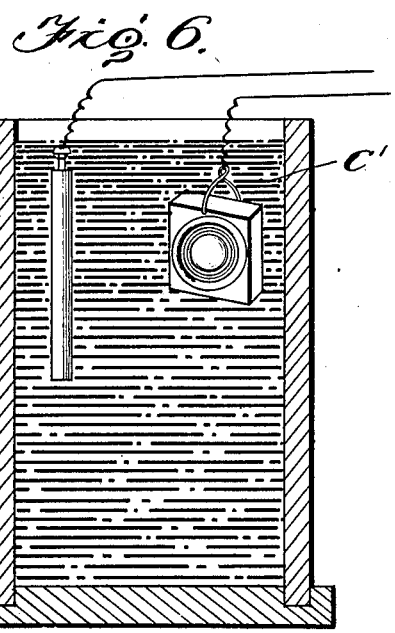
Figure 7:
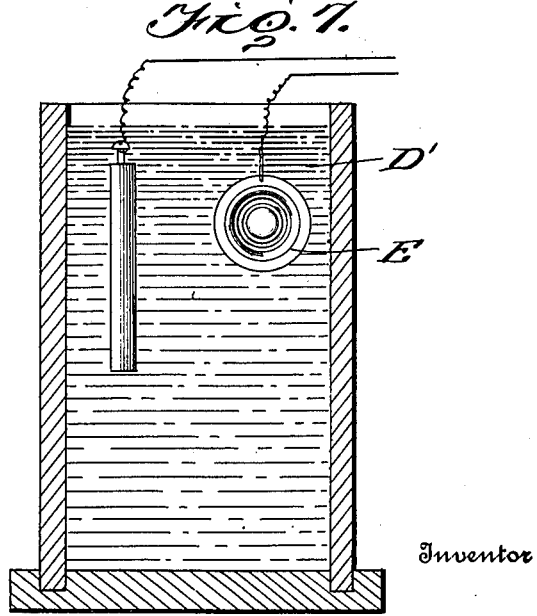

Figure 1 is a sectional view of a die and a block of wax preparatory to making a form. Fig. 2 is a similar view, but showing the die forced into the wax to provide a form. Fig. 3 is a sectional view of the complete form. Fig. 4 is a sectional view of the form provided with a coating of graphite. Fig. 5 is a view showing a detail sectional illustration of the step of removing the semi-complete diaphragm from the form. Fig. 6 is a view conventionally illustrating the graphited wax form receiving a coating of copper. Fig. 7 is a view similar to Fig. 6, but illustrating the copper sheet as receiving nickel plating to standardize the diaphragm and make same resilient. Fig. 8 is an illustration of a die and block of wax separated, and an interposed sheet of tin foil ready to be pressed. Fig. 9 is a similar view, but showing the die pressing the tin foil into the wax or harder substance. Fig. 10 is a conventional illustration showing the tin foil in the form being nickel plated to standardize the diaphragm. Fig. 11 is a view similar to Fig. 8, but substituting an annealed sheet below standard, instead of tin foil. Fig. 12, is a view showing the die pressing the annealed sheet into the form. Fig. 13 is a view of the interposed sheet. Fig. 14 is a view showing the plate in a nickel bath to stiffen the plate. Fig. 15 is a view of a plain diaphragm made in accordance with my improvement.

I have discovered several methods of manufacturing diaphragms; each being practical, but one makes a diaphragm which produces a little less scratch than the other. In one instance, I make a form A of proper diameter and design, dished or corrugated, or plain, according to the diaphragm to be produced, either of lead or soft or hard steel, or any other substance that will stand the pressure required to press the design into copper plater's wax or bees wax, cover same with graphite B and plate with a thin layer of copper C; then put same in a nickel plating bath D' to give the copper deposit a nickel stiffening D; then remove the so formed diaphragm E from the wax so formed and then give it added nickel stiffening on the back to give it proper resiliency. The combined mold and diaphragm may be put into the nickel plating bath and the copper may be peeled off the plate to make it standard. After the diaphragm is tested to ascertain if it is of sufficient stiffness, and it is found to be deficient in this respect, it is only necessary to clean it thoroughly and again plate it to produce the desired thickness to make it standard.

The second method I employ is to force tin foil F into the wax by the design or form, the sheet of tin foil being laid on the wax, the tin foil then being pressed into the wax by the design form, the foil and wax taking the shape of design; the tin foil acting as a conductor for the nickel plating in place of the graphite and copper. Very thin and highly annealed foil, whether tin, gold, or other highly annealed and thin non-resilient material may be used.

I find that where a diaphragm is provided with a sheet of tin foil of approximately one thousandth of an inch, and then plated with nickel to give it resiliency, the tone of the production will be sweet and a little more of the scratch is eliminated when reproducing a selection, although when the copper plate is used, the diaphragm does not produce nearly so great a scratching noise as with diaphragms now employed.

I prefer using nickel to stiffen the diaphragm as it is highly resilient, and as it has the same snap as mica it naturally gives the metal the springy resiliency that is so absolutely necessary for diaphragm work. I have further found that the heavier the current used in plating, the stiffer the diaphragm will be, the plating may be used to plate a thin coat of silver or gold, or platinum, different tone effects can be reached, the variation in effects being unlimited.

In lieu of tin foil or graphite, I may substitute an annealed sheet, below standard, as shown in Figs. 11 to 14. The sheet is shaped between forms indicated at G—G. In this instance, the sheet is subjected to a nickel plating process to stiffen it, to make same standard.

The cost of manufacturing diaphragms according to my method is not prohibitive, as there are different means of making the pressed forms where it is not necessary to use wax. This is the now known lead impressions. They may be used indefinitely for receiving the deposit of copper and nickel or other material cited above, or that may be used in plating.

The cost of making male and female dies for pressing resilient diaphragms is almost prohibitive, when it is considered that it is impossible to tell just what form of corrugation of the diaphragm face would answer the best, for every minute detail must be considered, and when it is found that one shape would not do, it would be necessary, no matter how small the difference in the form might be, to make another complete set of dies, but with my method I am able to try different forms and make different shaped diaphragms more cheaply until a design which would work satisfactorily is formed and a steel male and female die could be made therefrom by which diaphragms could be formed from copper, silver, or any other material; the diaphragms could be below standard and brought up to standard by plating.

What I claim is:

1. The art of making a diaphragm, consisting in providing a piece of yielding material, making an impression of a diaphragm in said material, then coating the impression with conducting material, then depositing a thin layer of copper on said conducting material to form a diaphragm base, the said base being below the standard resiliency of a diaphragm, and finally depositing nickel on the diaphragm base by electro-plating for forming a resilient standard diaphragm.

2. The art of making diaphragms, consisting in providing a form corresponding to the shape of a diaphragm, coating said form with conducting material, depositing a layer of metal on said form by electro-plating to produce a diaphragm base below a standard, removing said diaphragm base from the form and then adding a layer of resilient metal to the base by electro-plating to form a standard diaphragm.

3. The art of making a diaphragm of predetermined form consisting in providing a base to form a diaphragm below a standard, then depositing resilient metal on said base by an electro-plating process to form a resilient standard diaphragm.

4. The art of making a diaphragm of predetermined form, consisting in providing a base of non-resilient metal to form a diaphragm below a standard, then depositing nickel on said base by an electro-plating process to form a resilient standard diaphragm.

5. The herein described method of making diaphragms consisting in forming a non-resilient diaphragm base below a standard in a form, and subsequently treating the diaphragm base in a bath to deposit a layer of resilient metal thereon to increase the thickness of said base and form thereby a standard resilient diaphragm.

In testimony whereof I have signed my name to this specification in the presence of two subscribing witnesses.

HENRY C. MILLER.

Witnesses:
H. R. VAN KLEECK,
E. F. JELF.